UNITED STATES PATENT OFFICE.

NIKODEM CARO, OF BERLIN, AND THEODOR EWALD SCHEELE, OF EMMERICH, GERMANY.

AMMONIUM-PHOSPHATE FERTILIZER.

1,001,350.  Specification of Letters Patent.  Patented Aug. 22, 1911.

No Drawing.   Application filed December 23, 1908. Serial No. 468,976.

*To all whom it may concern:*

Be it known that we, NIKODEM CARO and THEODOR EWALD SCHEELE, subjects of the King of Prussia, residing, respectively, at 20 Meinekestrasse, Berlin, and 23 Steinstrasse, Emmerich, Germany, have invented certain new and useful Improvements in Ammonium-Phosphate Fertilizers; and we do hereby declare the following to be a full, clear, and exact description of the invention, such as will enable others skilled in the art to which it appertains to make and use the same.

This invention relates to the manufacture of ammonium phosphate fertilizer which is non-hygroscopic, stable, and contains a larger percentage of plant food than similar products heretofore made.

According to United States Patent No. 709,185, a process is described in which phosphates are treated with sulfuric acid, and a solution of ammonium hydroxid is then caused to react on the resulting product to obtain a product containing phosphoric acid and nitrogen; this product, however, under the best conditions, contains only from 16% to 17% of plant food (phosphoric acid and ammonium); its content of phosphoric acid soluble in water continually decreases, so that not only phosphoric acid soluble in citrate solutions, but also tri-basic phosphate is formed when the product is stored for only a short time, and, finaly, the product is highly hygroscopic, and consequently cannot be readily strewn.

The use of ammonium phosphate as a fertilizer has heretofore failed, for the reason that the product obtained contained either too little nitrogen, or an unsatisfactory proportion of nitrogen to phosphoric acid, was hygroscopic, or was not stable, so that it lost its ammonium upon being stored or transported. These objections we have found are obviated by the present invention, and for this purpose we use as a starting material for the manufacture of ammonium phosphate, a solution of crude phosphoric acid, which solution is obtained by treating phosphate bearing materials with sulfuric acid, and which solution besides containing phosphoric acid, may also contain salts in solution that result from the reaction, as well as free sulfuric acid. Ammonia gas is conducted into such a solution to form ammonium phosphate; the solution is then evaporated to dryness, and a product is obtained which is not only dry and capable of being stored, and readily strewn, but which contains about 65% of plant food (phosphoric acid and ammonium), of which almost all the content of phosphoric acid is soluble in water, is stable, or of constant composition, and, especially, which has its content of nitrogen stable.

The hereinbefore described process of making stable and dry ammonium phosphate from crude phosphoric acid solution containing free sulfuric acid may be briefly explained by the following example, which also includes the manufacture of the phosphoric acid solution above mentioned. The said phosphoric acid solution can be obtained by treating ordinary crude phosphate with sulfuric acid of 15° to 20° Bé. in excess. The mass is stirred and reacts in such a manner that the sulfuric acid unites with the base (generally calcium oxid) combined with the phosphoric acid in the phosphate to form a sulfate, at the same time setting free the phosphoric acid, which goes into solution. The quantity of sulfuric acid is preferably such that it is not only sufficient for decomposing the phosphate but that there is also present an excess of about 10 per cent., which causes the sulfate of calcium or gypsum formed to be precipitated.

The decomposition of the phosphate (calcium phosphate) may be explained by the following equation:

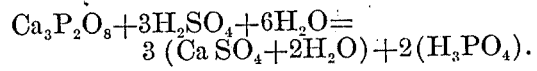

$$Ca_3P_2O_8 + 3H_2SO_4 + 6H_2O = 3(CaSO_4 + 2H_2O) + 2(H_3PO_4).$$

Into the phosphoric acid solution thus obtained, which is used after being freed or separated in any suitable manner, for example, by filtration, from the precipitated calcium sulfate, or gypsum, ammonia is preferably introduced until the acid contained in the solution is fixed, which can be recognized by the liquid beginning to have an odor of ammonia. The solution is now evaporated or dried, and the residue if necessary is freed from water by further drying, which can take place in any suitable known manner and at any suitable temperature, which is obviously lower than that at which the product, *i. e.*, the ammonium salt, decomposes.

To 1000 parts of crude phosphate rock containing in the neighborhood of 70% to 73% calcium phosphate, is added a solution composed of 850–900 parts of sulfuric acid of 60° Baumé, and 2000 to 2200 parts of water. The mixture after standing about six hours is filtered, and contains about 20 grams of $P_2O_5$ per liter, or about 2%, and from about 4 to 4.50 grams of $SO_3$, or from about .40% to .45%. To the filtrate is then added ammonia until it shows a weak alkaline reaction, containing about 8 to 8.50 grams of $NH_3$ per liter, or from about .80 to .85%. This solution is then evaporated to dryness, preferably under reduced pressure at 110° C.

We claim—

1. The method of manufacturing stable, non-hygroscopic ammonium phosphate fertilizer, which comprises forming a solution containing phosphoric acid and free sulfuric acid, rendering the solution slightly alkaline with ammonia gas, and drying the product.

2. The method of manufacturing stable, non-hygroscopic ammonium phosphate fertilizer, which comprises forming a solution containing phosphoric acid and free sulfuric acid by reacting on phosphate bearing materials with sulfuric acid, leading ammonia gas into the solution in amount sufficient to render the solution slightly alkaline and drying the product.

3. A fertilizer containing ammonium phosphate and sulfate whose content of phosphoric acid is soluble in water, which fertilizer is non-hygroscopic, is stable both as regards the ammonia and phosphoric acid, and can be readily strewn.

In testimony that we claim the foregoing as our invention, we have signed our names in presence of two subscribing witnesses.

NIKODEM CARO.
THEODOR EWALD SCHEELE.

Witnesses:
   HENRY HASPER,
   WOLDEMAR HAUPT.